UNITED STATES PATENT OFFICE.

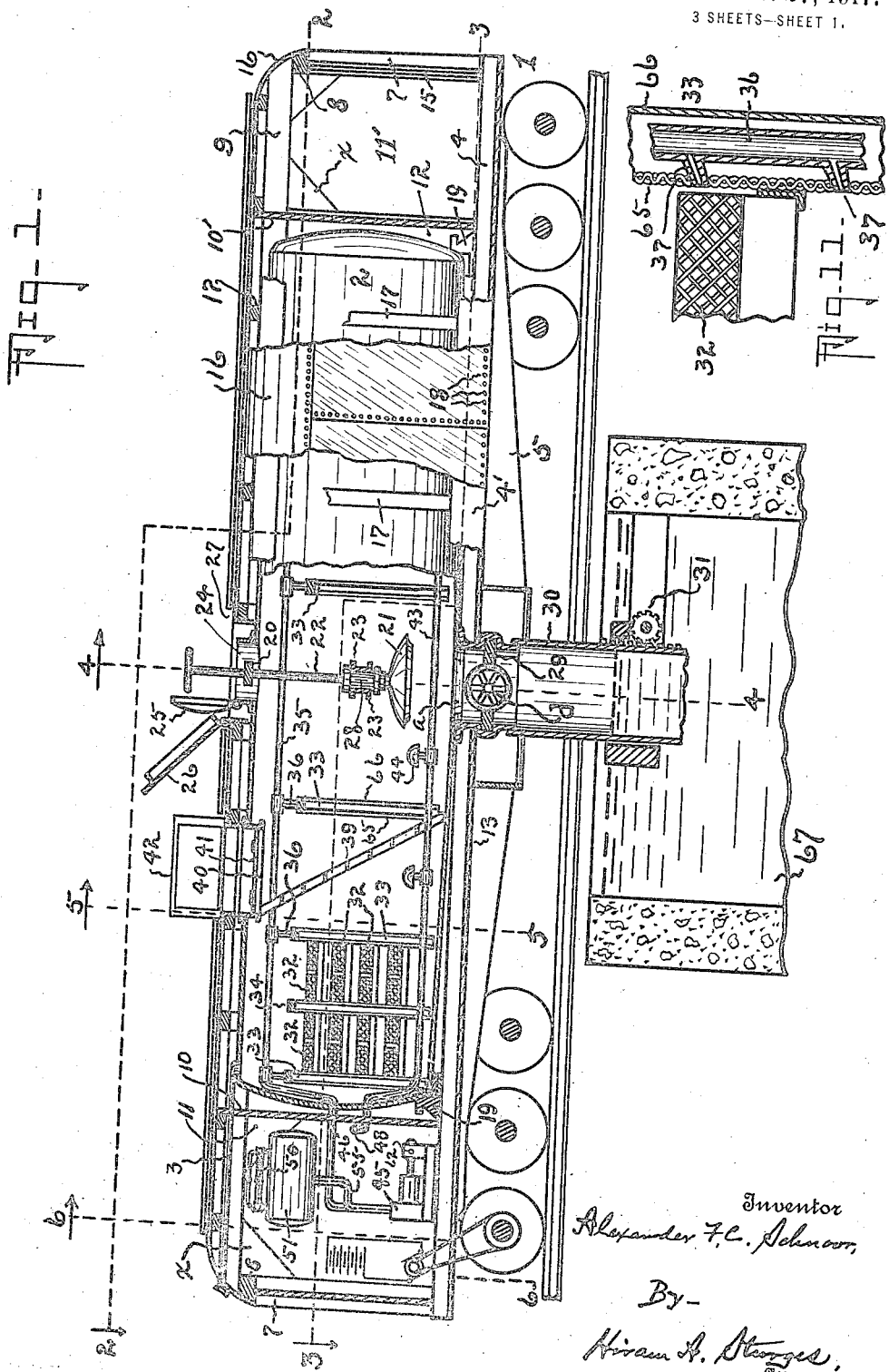

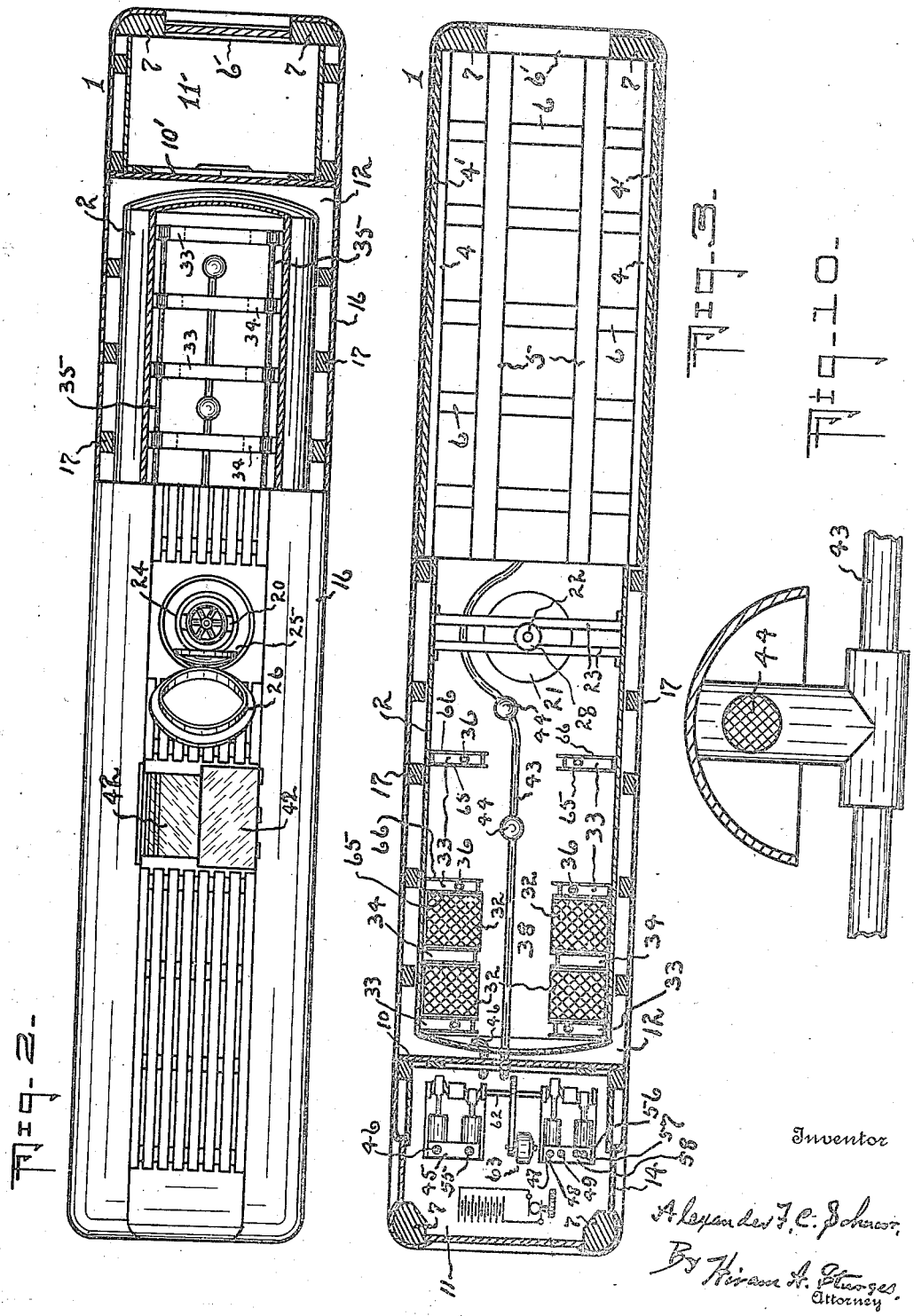

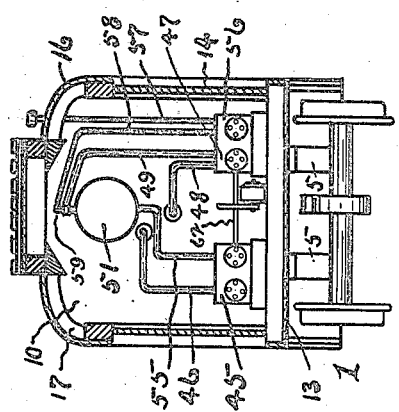

ALEXANDER F. C. SCHNOOR, OF OMAHA, NEBRASKA.

FISH-TRANSPORTATION SYSTEM.

1,248,169.   Specification of Letters Patent.   Patented Nov. 27, 1917.

Application filed February 12, 1917. Serial No. 148,068.

*To all whom it may concern:*

Be it known, that I, ALEXANDER F. C. SCHNOOR, a citizen of the United States, residing at Omaha, in the county of Douglas and State of Nebraska, have invented certain new and useful Improvements in Fish-Transportation Systems, of which the following is a specification.

This invention relates to a means for transporting fish, frogs, shell fish or the like in a manner which will not be injurious to the stock, so that they may be marketed in a live condition, the place of delivery being remote from a receiving station, as from a sea shore to an inland point, the object being to avoid the usual expense of refrigeration, and particularly to deliver sea foods in a live condition to the consumer. While the herein described means may be used to advantage for marketing live sea foods it may, of course, be useful for other purposes.

The invention has reference to the use of a carrier so constructed that water may be maintained substantially at a uniform temperature and may be aerated, and to features relating to loading and unloading the stock. With these and other objects in view to be mentioned hereinafter, the invention presents a novel combination and arrangement of parts as described and claimed, and as illustrated in the accompanying drawing, wherein,—

Figure 1 is a view in side elevation of a car or carrier employed, parts being broken away and in section, a part of a discharge chute and container being added. Fig. 2 is a plan view of the same, a part of the car being in section on line 2—2 of Fig. 1. Fig. 3 is a sectional view on line 3—3 of Fig. 1. Fig. 4 shows a transverse section on line 4—4 of Fig. 1. Fig. 5 is a transverse section on line 5—5 of Fig. 1. Fig. 6 is a transverse section on line 6—6 of Fig. 1. Fig. 7 shows a spiral chute for loading live stock fish, a part being broken away. Fig. 8 is a transverse section on line 8—8 of Fig. 9. Fig. 9 is a partly broken side view of a mixing tank. Figs. 10 and 11 are details.

Referring now to the drawing for a more particular description, numeral 1 indicates a carrier illustrated as a railway car, and at 2 is indicated a main tank for containing water and the stock, sea water being used if the stock is for sea foods. If live fish are to be shipped, the per cent. in bulk of the fish to water may be substantially sixty per cent., and the tank should be filled to substantially four-fifths of its capacity when loaded. At 3 (Fig. 1.) is indicated a ventilating pipe for conducting gases from the tank.

In order that the water may be maintained at, approximately, a uniform temperature and that repairs may be made to the tank when required, and that stresses directed to the car may be adequately sustained and that undue vibration to the tank and its contents may be avoided, the structural parts of the car include a suitable underframe comprising side sills 4 provided on their inner sides with face plates 4′ and a pair of longitudinally trussed sills 5 provided with side extensions 6, connected with the side sills and the end sills 6′. Numerals 7 indicate upright posts provided for each corner of the car frame, these being connected by cross plates 8 as best shown in Fig. 1, a pair of reinforcing plates 9 being provided for the upper part of the frame and extending the entire length of the car with their ends resting upon the plates 8, and supported by braces $x$. A pair of transverse partitions are indicated at 10 and 10′ to provide compartments 11 and 11′ at the ends of the car, and an intermediate, main chamber 12. The underframe is provided with a floor 13, and doors for the compartments 11 and 11′ are indicated, respectively, at 14 and 15.

The parts mentioned when suitably connected provide a car frame upon which may be removably mounted a shell, cover or closure member 16 which is adapted to cover the top and sides of the parts mentioned, except the sides and ends of the compartments 11 and 11′, the top of member 16 having a curvature as shown in the drawing and being provided, on its inner side and at longitudinal intervals with carlines 17.

The cover 16, carlines and other parts carried thereby may be elevated or lowered by any suitable means and placed in position upon the car frame mentioned after the tank 2 has been mounted on said frame, the lower part of said cover being secured to the plates 4 by any suitable means, as by use of keepers 18, and the lower ends of the carlines being supported by the side sills.

The bottom of the tank 2 is inclined from its ends to a discharge aperture a at its middle, the ends of the tank engaging the resilient bearing-blocks 19 disposed on the floor, adjacent to the partitions; and as described, an air chamber is provided between the walls of the tank and inclosing member or shell 16 adapted to maintain the temperature for the tank and contents substantially uniform; and on account of the construction, said member 16 may be elevated, after the keepers 18 have been removed, to permit repairs or adjustments to be made.

Numeral 21 indicates a disk-valve adapted to control the discharge aperture a of the tank, the movements of this valve being operated by its stem or shaft 22, from the top of the car, the stem or shaft being disposed vertically and supported by cross-bars 23 and a bar 20 disposed in the dome 24, with which the upper part of the tank is provided. Numeral 25 indicates a lid as a closure for the top of the dome, and at 26 is indicated a hinged door for making a closure of an aperture 27 which is formed in the top of the cover 16 above the dome.

It will be understood that the valve 21 is normally closed to prevent any discharge of water, the stem 22 having a threaded connection with a block 28 and being rotated for this control, a rotation of the block being prevented by the cross-bars 23.

Numeral 29 indicates a slide valve, the valve casing therefor being connected with and projecting downwardly from the bottom of the tank, and at 30 is shown a coupling-sleeve employed at a receiving station, arranged to have a slidable movement upwardly for a communication with the casing of the valve 29 when unloading occurs. the movement of the coupling-sleeve being by means of a pinion 31, rotatable by any suitable means for this purpose.

Since the invention includes means for the transportation of frogs or for certain sea foods such as oysters, lobsters or the like in live condition as well as fish, separate receptacles are used in the tank 2, as indicated at 32. In order that these receptacles may be disposed in spaced relation so that their contents may be thoroughly sprayed with aerated water, their form is preferably rectangular in plan, and they are disposed horizontally, one above the other between certain upright supports 33 and 34, and are suitably spaced apart, the arrangement being that the receptacles 32 may be removed from the tank whenever desired and may be stored in the compartment 11′ of the carrier.

By referring to Figs. 1 and 3 it will be seen that the receptacles 32 are so constructed that water may readily reach their contents. Numerals 35 indicate a pair of horizontal supply pipes disposed in the upper part and extending approximately the entire length of the tank for conducting aerated water, each being provided with vertical, downwardly projecting tubular branches 36, said branches being disposed between the sides of a support 33 and being provided with suitable nozzles 37 so that the contents of each receptacle may be sprayed.

Numeral 38 indicates an aisle or passageway for workmen, said passageway extending approximately the entire length of the tank between the sections, and at 39 is indicated a ladder arranged so that the receptacles may be handled to advantage for loading or unloading; and the tank is provided at its top with manholes 40, and closures 41 therefor, the cover or shell 16 also being provided with doors 42 through which the stock and receptacles 32 may be hoisted or carried, as desired, the ladder, of course, being adapted to be removed whenever desired. The receptacles 32 are therefore arranged in sections between the upright supports 33 and 34, and between the aisle 38 and the opposed sides of the tank; and the receptacles 32 are, preferably, collapsible, so that they may be folded when stored in the compartment 11′.

At 43 is indicated a drainage pipe disposed at the medial line near the bottom of the tank 2 and provided at longitudinal intervals with strainers for the intakes, as indicated at 44. In instances when receptacles 32 are used and mounted in sections, as mentioned, either sea water or fresh water may be used, depending upon the kind of stock contained in the receptacles, the water in the tank 2 being sufficient to completely cover the intakes 44, and when aerated, the water will move upwardly from the pump 45 through the pipe 46 to the two supply pipes 35 which extend longitudinally of the tank 2, above the upright supports 33 and 34, said aerated water being discharged from the nozzles 37 of the upright branches mentioned.

For the purpose of aerating the water, a pump 47 is used, its suction pipe from the drain pipe 43 being indicated at 48 and its upright discharge pipe being indicated at 49 which communicates with a two-way pipe 50 of the oxygenator or mixing receptacle 51, the discharges being downwardly through nozzles 52 upon distributing members 53 of any suitable form and shown herein to be of cone-shape, the water thereafter moving through a plurality of framed wire cloth or wire mesh 54 and 54′ mounted in said receptacle and disposed substantially at right angles to the axes of the nozzles, the water from the receptacle 51 thereafter moving to the pump 45 through the pipe 55.

Means for compressing air from the atmosphere and for delivering it to the receptacle 51 consists of an air pump 56 having an intake pipe 57 extending outwardly of the cover 16, its discharge pipe 58 communicating with a two-way pipe 59 provided at its terminals with downwardly projecting nozzles 60, each having a convergent bore as best shown in Fig. 9, said nozzles 60 being disposed in a hood 61 opening below the nozzles 60, said hoods being formed convergent toward their lower ends.

Each cone 53 is mounted stationary upon the upper screen frame somewhat above the middle of the mixing receptacle, its apex being disposed below and in line with the longitudinal axes of the nozzles and hood. The pumps 45, 47 and 56 are preferably operated by a single crank shaft 62 actuated by any suitable means, an electric motor 63 being shown for this purpose, and the parts for said pumps and their connections are so proportioned that the quantity of water withdrawn from the tank will correspond with the quantity of water discharged from the nozzles 37.

By use of the construction as described, water will be gradually drawn from the tank 2 practically free from sediment and will be thoroughly aerated before it is returned thereto, the air containing a normal per cent. of oxygen moving through the nozzles of the two-way pipe 59 as a narrow column with great force for moving the annular sheet of water at the lower edge of the hood with a like force upon the distributer 53, the water thereby being atomized or sprayed to advantage and mixed with pure air under compression.

For transporting fish, the receptacles 32 are removed, and the valves 21 and 29 being closed, the tank 2 is partly filled with water, and by use of the spiral chute 64 the fish, together with an additional supply of water are conducted to the water in the tank, the fish and water moving down the inclined way of the chute in such a manner that the fish will not be injured.

By referring to Figs. 3, 4 and 5 it will be seen that one side of each support 33 is provided with a perforated web or screen 65, this being of advantage to cause the aerated water to become more readily mixed with the remaining water in the tank, for it will be understood that the car when moving upon curves or upon inclined ways will change the inclination of the tank, and the agitation of the water resulting from the construction as described is a desired feature; also, as best shown in Fig. 1, each support 33 is provided with an imperforate wall 66 to prevent water within the tank from moving too freely through the perforate part 65, this being for the purpose of preventing the formation of currents of water which would tend to move the fish against the perforate parts to cause their injury.

By use of the means described, the original supply of water is constantly aerated and circulated and the fish may be maintained in a healthy condition for several days during transportation without taking on a fresh supply of water, the speed of the pumps and bore of the pipes being of suitable proportion for this purpose, and the speed of the pumps being increased if the time required in transit is unduly prolonged, so that an adequate degree of oxygenation for the water will be maintained at all times.

For unloading the fish at a delivery station, the valves 29 and 21 are opened, the lids for the dome also being open, and the live fish and water will be conducted from the bottom aperture $a$ to a stationary vat or container 67, provided for that purpose. The fish during unloading will not be injured since member 29 is a slide valve operated by threaded shafts $d$ as best shown in Figs. 1 and 4, and remains closed until the disk valve 21 has been elevated, comparatively, a considerable distance from its seat.

It will be appreciated that the practice of the invention may result in many advantages, since live fish in healthy condition may be supplied to markets remote from a sea shore, and the necessary freezing of fish as practised may be avoided, and refrigeration before and during transit, which is comparatively expensive, will not be necessary.

Having fully described my invention, what I claim and desire to secure by Letters Patent is,—

1. In a transportation system for live fish, a carrier having a hollow body, a tank in said hollow body for containing water and fish, a drain pipe provided with intakes and disposed in the lower part of the tank, a water supply pipe above the drain pipe provided with discharge ports, a receptacle, means to conduct water from the drain pipe to the receptacle, means for compressing air and for mixing the compressed air with the water in the receptacle, and means for conducting the water from the receptacle to the water supply pipe.

2. In a transportation system for live fish, a carrier having a hollow body, a tank in said hollow body for containing water and fish, said tank being provided with a valve housing projecting below its bottom, a valve in the valve housing below the tank, a second valve within the tank, devices arranged for manually operating said valves, and means for aerating the water of the tank.

3. In a transportation system for live fish, a car body, a cylindrical tank for containing water and fish and having ports in its top and a discharge port in its bottom, said tank being arranged within and providing an air chamber between the car body and the top and sides of said tank, means for aerating the water of the tank, closures for the top ports of the tank, a valve for the discharge port of the tank, and means exteriorly of the tank for operating said valves.

4. In combination, a car underframe, a cylindrical tank for containing water and live fish carried by said car underframe, a car body upon and detachably connected with the car underframe, said car body providing an air chamber between its walls and the sides and top of the tank, pumping mechanism for moving the water from the tank, air compression and spraying mechanism for aerating the water moved by the pumping mechanism, and mechanism for moving the aerated water to said tank.

5. In combination, a car, a tank for containing water and live fish, said tank being resiliently supported centrally of the body of said car, water aerating mechanism including a receptacle provided with an inwardly projecting nozzle, a convergent hood disposed outwardly of and in line with the axis of said nozzle, a second nozzle circumscribed by the hood and disposed in line with the first named nozzle, a plurality of screens disposed in the receptacle substantially at right angles to said nozzles, mechanism for conducting water from the tank to the receptacle through the first named nozzle, mechanism for conducting air from the atmosphere and discharging said air in compressed condition through the second nozzle, and mechanism for conducting the water from said receptacle to said tank.

6. In combination with a car, a tank carried thereby for containing water and live fish, said car being provided with ports in its top and a discharge passageway in its bottom, a valve for controlling said discharge passageway, a spiral chute for conducting the water and live fish through one of said ports to the tank, a receptacle, means for moving water from the tank to the receptacle, means for compressing air and for mixing the compressed air with the water in the receptacle, and means for delivering the water from the receptacle to the tank after it has been mixed with the compressed air.

7. In a transportation system, an elongated tank for containing water and live fish, said tank having an upper port and a lower port, a valve for closing the lower port, devices for loading the water and fish through the upper port, a carrier for conducting the tank from a receiving station to delivery stations, means for aerating the water of the tank including a receptacle, means for moving the water from the tank to the receptacle, means for compressing air from the atmosphere and mixing the air while under compression with the water in said receptacle, means for conducting the water from the receptacle to the tank, and devices for a control of said valve to permit unloading of the water and fish through the lower port of the tank.

8. In combination with a car, a tank for containing water and live fish, said tank being disposed centrally of the body of the car, water aerating mechanism including a receptacle provided with inwardly projecting nozzles, convergent hoods each being disposed outwardly of and in line with the axis of a nozzle, secondary nozzles circumscribed by the hoods, each secondary nozzle being disposed in line with one of the first named nozzles, a screen disposed in the receptacle below and at substantially right angles to said nozzles, distributing-members on the screen each having a cone shaped part disposed in line with the axes of a nozzle, a hood and a secondary nozzle, pumping mechanism for conducting water from the tank to the tank through the first named nozzles, pumping mechanism for conducting air from the atmosphere and discharging it in a compressed condition through the secondary nozzles, and means for conducting the water from said receptacle and delivering it to said tank.

9. In combination with a car, a tank resiliently supported therein for containing a supply of water and provided at intervals of its length with upright supports disposed transversely thereof, each support including a perforate wall, a plurality of crates for containing live shell fish or the like, said crates being disposed one above the other between said supports, a water supply pipe in the tank above the crates, said pipe being provided with downwardly projecting tubular branches having nozzles disposed adjacent to said crates, a receptacle, means for moving water from the tank to the receptacle, means for aerating the water in the receptacle, and means for delivering the water under pressure from the receptacle to the nozzles of said tubular branches for delivery of said water to the contents of the crates.

10. In combination with a car, an elongated tank adapted to be partly filled with water and disposed in the car, said tank being provided transversely thereof, midway between its horizontal sides and medial line with upright supports each including a perforated wall, crates for containing live shell fish or similar live stock, said crates being of rectangular form in plan and removably arranged one above the other in sections between the supports and above the water of the tank, a drain pipe in the tank, said pipe having intakes provided with strainers disposed in the water of the tank, water supply pipes provided with nozzles adjacent to the crates, a receptacle, means for moving water through said strainers from the tank to the receptacle, means for aerating the water in the receptacle, and means for moving the aerated water from the receptacle to the nozzles of the water supply pipes.

11. In combination with a car, a tank resiliently supported therein adapted to contain a supply of water and provided at longitudinal intervals with upright, transverse supports, each including a perforate wall and an imperforate wall, a plurality of crates rectangular in plan for containing live shell fish or similar live stock, said crates being removably mounted one above the other upon said supports above the water supply of the tank, a drain pipe disposed longitudinally of the tank and having intakes provided with strainers disposed in the water thereof, a water supply pipe extending longitudinally of the tank above the crates and provided with downwardly projecting tubular branches between the perforate and imperforate walls of said supports and having nozzles disposed adjacent to said crates, a receptacle, means for moving water from the tank through the strainers and drain pipe to the receptacle, means for compressing air and for mixing the compressed air with the water in the receptacle, and means for delivering the water from the receptacle to the water supply pipe.

In testimony whereof, I have affixed my signature in presence of two witnesses.

ALEXANDER F. C. SCHNOOR.

Witnesses:
 HIRAM A. STURGES,
 ARTHUR H. STURGES.

Copies of this patent may be obtained for five cents each, by addressing the "Commissioner of Patents, Washington, D. C."